United States Patent
Mammoto et al.

(10) Patent No.: US 7,351,134 B2
(45) Date of Patent: Apr. 1, 2008

(54) MEAT DRESSING/BONING METHOD AND SYSTEM THEREFOR

(75) Inventors: Shinzo Mammoto, Koto-ku (JP); Katsumi Toyoshima, Koto-ku (JP); Kazuchika Hino, Koto-ku (JP); Takeshi Chimura, Koto-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 0 days.

(21) Appl. No.: 11/363,529

(22) Filed: Feb. 27, 2006

(65) Prior Publication Data

US 2006/0205334 A1   Sep. 14, 2006

Related U.S. Application Data

(63) Continuation of application No. PCT/JP2004/012596, filed on Aug. 25, 2004.

(30) Foreign Application Priority Data

Aug. 27, 2003   (JP)   ............... 2003-303712

(51) Int. Cl.
*A22C 17/02* (2006.01)
(52) U.S. Cl. .................................... 452/149
(58) Field of Classification Search ................ 452/149, 452/52–54, 106, 107, 125, 127, 132, 166, 452/187
See application file for complete search history.

(56) References Cited

U.S. PATENT DOCUMENTS

| | | | |
|---|---|---|---|
| 4,015,538 A * | 4/1977 | Webb et al. ................... 104/97 |
| 4,651,384 A | 3/1987 | Korhonen | |
| 4,653,149 A * | 3/1987 | Swilley ....................... 452/129 |
| 4,797,975 A * | 1/1989 | Soullard et al. ............. 452/135 |
| 6,244,951 B1 * | 6/2001 | Leining ....................... 452/185 |
| 6,334,811 B1 * | 1/2002 | Cremonini .................. 452/149 |
| 6,881,138 B2 * | 4/2005 | Kruger ........................ 452/154 |

FOREIGN PATENT DOCUMENTS

| | | |
|---|---|---|
| JP | 2000-83575 A | 3/2000 |
| JP | 2000-106818 A | 4/2000 |
| JP | 2000-125752 A | 5/2000 |
| JP | 2002-223694 A | 8/2002 |

OTHER PUBLICATIONS

Relevant portion of International Search Report of corresponding PCT Application PCT/JP2004/012596.

* cited by examiner

*Primary Examiner*—Thomas Price
(74) *Attorney, Agent, or Firm*—Rossi, Kimms & McDowell, LLP

(57) ABSTRACT

A meat dressing and boning method and a system thereof can dress and bone meat and carcass in short work-hours, while avoiding bacterial contamination. The system includes a clamp mechanism for holding a meat block with bones, a hanger connected to clamp mechanism and movably suspended from a support rail, and a guide rail or rails having a tubular or rod-like configuration for supporting the meat block positioned along and below the support rail. The hanger has at least two pivots to allow the meat block held by the clamp mechanism to rotate about at least first and second axes, which are perpendicular to each other. The meat and carcass can be broken up and boned while being moved along the support rail, with the swinging directions of hanger regulated by the guide rail or rails.

10 Claims, 6 Drawing Sheets

MEAT DRESSING/BONING METHOD AND SYSTEM THEREFOR

This is a continuation of International Application PCT/JP2004/012596 having an international filing date of 25 Aug. 2004, and claims priority under 35 U.S.C. § 119(a) to Japanese Application No. JP 2003-303712, filed on 27 Aug. 2003. The disclosure of the PCT and priority applications, in their entirety, including the drawings, claims, and the specification thereof, are incorporated herein by reference.

BACKGROUND

Japanese Laid-Open Patent Application No. 2000-83575 (hereafter Reference 1) and Japanese Laid-Open Patent Application No. 2000-125752 (hereafter Reference 2) disclose a boning/dressing apparatus for processing a carcass of pig, chicken, cattle, etc., to obtain a meat block. Reference 1 discloses an apparatus for securing a pig carcass, with a dissection line rail from which the pig carcass can be hung with a hanger so that the carcass can be transferred along the rail by transferring the hanger along the rail. The apparatus also has a plate with its upper end rotatably supported so that the plate can be turned upward in a plane perpendicular to the transfer direction of the carcass, i.e., perpendicular to the direction of the dissection line rail. The plate has a groove in which the back side of the carcass can be fitted and secured. The carcass is secured in the groove of the plate in a slanted attitude utilizing its own weight. Workers can dissect and bone while the carcass secured to the plate.

Reference 2 discloses an apparatus for taking out meat from the head of a carcass of cattle, etc. The head of the carcass is hung by a chin supporting member having a chin supporting hook and a mouth opening protrusion provided at the upper part of a supporting member. The apparatus also includes a cheek pulling member that pulls down cheeks, clamping both of the cheeks, an upper jaw removing means, a driving device for moving the cheek pulling member, and a driving member for moving the upper jaw removing means.

In the apparatus of Reference 1 for dissecting and boning a pig carcass, the worker can change only the inclination of the plate to adjust the attitude of the carcass while dissecting and boning a pig carcass. Therefore, the worker must perform the dissection and boning while pushing the carcass against the plate with one of his/her hand not holding a knife, making the work complicated and resulting in an increased operation time.

Further, in a conventional art like above, as the dissection and boning process is carried out while the back of the pig carcass is received in a groove formed on the upper surface of the flat plate to secure the pig carcass therein, the carcass comes into plane contact with the surface of the groove, resulting in an increased contact area, which tends to induce contamination of the pig carcass with various kind of bacteria from the plate side.

In the apparatus for taking out meat from the head of a carcass of cattle, etc., of Reference 2, as the head of the carcass is hung by a hanger while pulling the upper jaw and cheeks by means of the upper jaw removing means and cheek pulling means driven by driving means, while dissection and boning is carried out, the dissection and boning work is done with the head hung in an unstable condition, and work efficiency becomes low, resulting in an increased operation time.

Accordingly, there remains a need to provide a way in which dissection, boning, and dressing operation of the meat block with bones can be performed more easily in a shorter operation time, while evading contamination of the meat block with bacteria. The present invention addresses this need.

SUMMARY OF THE INVENTION

The present invention relates to a method and a system for boning and dressing meat block with bones such as a thigh, shoulder, arm, head, or carcass, in which the meat block with bones is boned and dressed while it is clamped and hung.

One aspect of the present invention is a system for dressing/boning a meat block with bones. The system can include a support rail extending along a processing line, a clamp mechanism for holding the meat block, a meat-block support or hanger suspended from the support rail and attached to the clamp mechanism, and a guide made of a pipe or bar and extending along and below the support rail for supporting the meat block with bones. The guide is configured so that the meat block with bones comes into line contact with the guide. The meat-block support includes at least first and second pivots to allow the meat block held by the clamp mechanism to rotate about at least first and second axes.

The meat-block support includes a supporting bar, a support-rail connector pivotally connected to the supporting bar to provide the first pivot, and a clamp-mechanism connector pivotally connected to the supporting bar to provide the second pivot. The clamp-mechanism connector is connected to the clamp mechanism. The support-rail connector is movably connected to the support rail and is pivotally supported relative to the support rail to provide a third pivot. The clamp mechanism can be rotatably connected to the clamp-mechanism connector to provide a fourth pivot.

The first axis is perpendicular to the third axis and the second axis. The third axis is perpendicular to the processing line direction. The first pivot includes a first pivot joint provided between the support-rail connector and the supporting bar. The supporting bar is pivotable along the first axis, which is parallel to the support rail. The second pivot includes a second pivot joint provided between the supporting bar and the clamp-mechanism connector. The clamp-mechanism connector is pivotable about the second axis, which is perpendicular to the processing line direction. The movement of the meat block with bones about the first and second axes is restricted by the contact of the meat block with bones with the guide.

The guide can include a pair of guide rails extending along and below the support rail. Each of the guide rails can include an inclined section for raising the meat block with bones and a horizontally extending section continuing from the inclined section and extending substantially parallel to the support rail.

Alternatively, the guide can include a movably mounted guide rail extending along and below the support rail. The guide rail is movable substantially perpendicularly with respect to the support rail so that the guide rail is movable toward and away from a worker. The guide rail can be connected to links that are pivotally supported on a platform so that the guide rail is pivotable relative to the platform. An actuator, such as a hydraulic or air cylinder, can push or pull the guide rail away from or toward the worker.

Another aspect of the present invention is a method of dressing/boning a meat block with bones. The method can include providing the support rail extending along a processing line, securing the meat block with bones to the clamp mechanism, suspending the clamp mechanism with the meat block with bones to the support rail with the meat-block support, and permitting the meat block with bones to pivot about the first and second pivots to allow the meat block attached to the clamp mechanism to rotate about at least first and second axes, and supporting the suspended meat block with bones with the guide. The meat block can be dissected/boned/dressed while the meat block is in contact with the guide. The guide can restrict the movement of the meat block with bones about at least the first and second axes.

The guide rails are spaced apart so that the meat block with bones can be laid or rest on the guide rails without the same falling between them. The meat block with bones can be boned/dressed while it is resting on the guide rails. Specifically, the meat block with bones can be boned/dressed in the horizontally extending portions of the guide members with the attitude thereof in the vertical direction kept stable. The meat block with bones can be dissected/boned/dressed while restricting the displacement of the guide rail. The meat block with bones can be boned/dressed while rotating clamp mechanism with the meat block with bones as necessary.

Dissection/boning/dressing of a meat block with bones can be manually made while it is held by the clamp mechanism. The hanger can comprise the supporting bar comprising an upper side supporting bar and a lower side connecting bar. The first joint can be provided between the upper end side of the upper side supporting bar and the support rail to allow the upper side supporting bar to swing in a plane containing a straight line perpendicular to the support rail and the axis of the upper side supporting bar. The second joint can be provided between the lower end side of the upper side supporting bar and the lower side connecting bar for connecting the clamp mechanism to the lower end side of the upper side supporting bar to allow the clamp mechanism to swing in a plane containing a straight line parallel to the support rail and the axis of the connecting bar. A guide means or the guide made of pipe or bar material can extend along and below the support rail so that a part of the surface of the meat block with bones opposite to the surface processed by a worker comes into a line contact with the guide means or the guide. The meat block with bones is dissected/boned/dressed while it is transferred in an attitude the swings thereof by means of the first and second joint are restricted by the contact thereof with the guide means or the guide.

The meat block with bones can be hung by the hanger or meat-block support, and the back or lower surface of the meat block with bones, that is, the surface opposite to a surface on which the worker applies force mainly for processing (the surface processed by the worker) can be brought into contact with the guide or guide means extending parallel to the support rail, so that dissection/boning/dressing can be carried out while it is transferred by transferring the hanger along the support rail in a state in which the attitude of the meat block with bones is restricted by the guide or guide means, since the swing of the meat block with bones in a plane containing a straight line perpendicular to the support rail and the center axis of the supporting bar by virtue of the first joint provided between the upper end side of the supporting bar and the support rail and the swing in a plane containing a straight line parallel to the support rail and the center axis of the connecting bar by virtue of the second joint provided between the lower end side of the supporting bar and the clamping mechanism are restricted by the contact of the meat block with bones to the guide or guide means. Therefore, the operation of dissecting/boning/dressing of the meat block with bones can be carried out while complying with the change of attitude of the meat block with bones along the guide or guide means extending along the support rail or adjusting the distance between the meat block with bones and the worker and the inclination or horizontality of the meat block with bones.

As the meat block with bones is hung with its upper part clamped by the hanging mechanism and the bottom surface or the lower part of the back face thereof (part of the surface opposite to the surface to be processed by a worker) is supported by the guide or guide means to restrict the attitude thereof, the meat block with bones can be stably secured in position without the application of force by the worker. Therefore, there is no need to press the meat block with bones (pig carcass) with a hand of the worker when performing operation of dissecting/boning as in Reference 1, and the operation can be carried out using both hands.

Further, as the guide or guide means is made of pipe or bar material, the guide or guide means supports the meat block with bones with a line contact, and the contamination of the meat block with bones with bacteria can be suppressed compared to that disclosed in Reference 1 in which the meat block with bones (pig carcass) is supported with a plane contact. Thus the operation of dissecting/boning/dressing can be performed very sanitarily.

The meat block with bones, which is held by the clamp mechanism and hung by way of the first joint for allowing a swing in a plane containing a straight line perpendicular to the support rail and the axis of the supporting bar, and the second joint for allowing a swing in a plane containing a straight line parallel to the support rail and the axis of the connecting bar, can be laid on the inclined section of the two fixed guide members or rails extending parallel to the support rail when performing initial processing with its lower side surface stably contacting onto the guide members or rails. The meat block with bones can be kept in a nearly upright attitude leaning on the inclined section by virtue of the second joint provided just above the clamping mechanism for allowing the swing in a plane containing a straight line parallel to the support rail and the axis of the connecting bar. Therefore, initial processing becomes easy in the nearly upright attitude of the meat block with bones. Then, the meat block with bones is transferred to the horizontal portion of the guide or guide means by transferring it along the support rail, and the main processing of the meat block with bones can be carried out with the meat block with bones kept stably in a horizontal attitude.

Alternatively, the meat block with bones can be dissected/boned/dressed while restricting and adjusting the swing angle at the first joint of the hanger member in accordance with the displacement of the guide or guide means. In this embodiment, the guide or guide means made of pipe or bar material extending along the support rail is located so that the back face of the meat block with bones comes into contact with the guide or guide means. The guide or guide means is supported to face the worker and movable in directions to depart or access from or to the worker. The swing displacement of the meat block with bones around the first joint which allows a swing in a plane containing a straight line perpendicular to the support rail and the axis of the supporting bar is restricted by the guide or guide means.

As the guide or guide means is supported to face the worker and movable in directions to depart or access from or to the worker, the swing angle of the meat block with bones around the first joint is determined in accordance with the displacement of the guide means, and the inclination of the meat block with bones can be determined flexibly as desired.

Further, by connecting the clamp mechanism to the connecting bar connecting the clamp mechanism to the second joint to be rotatable around the center axis of the connecting bar, the meat block with bones can be rotated around the connecting bar in the state where the meat block with bones is leaning against the guide or guide means, so that knife operation in the vertical direction including removing fat and dressing meat can be done more easily, resulting in easier processing of the meat block with bones on both front and back face thereof, which is particularly effective for boning in a hung attitude of the meat block with bones.

The supporting bar can be connected to the first joint rotatably around the center axis of the supporting bar or the second joint can be connected to the supporting bar rotatably around the center axis of the supporting bar instead of connecting the clamp mechanism to the connecting bar to be rotatably around the center axis of the connecting bar.

The meat block with bones clamped by the clamping mechanism and hung from the support rail can be flexibly changed in its inclination and distance from the worker by virtue of the first joint, which allows a swing in the plane containing a straight line perpendicular to the support rail and the center axis of the supporting bar, and the second joint, which allows a swing in the plane containing a strait line parallel to the support rail and the center axis of the connecting bar, only by moving a single guide member or rail back and forth to and from the worker by driving means, such as a hydraulic cylinder, allowing dissection/boning/dressing of the meat block with bones to be performed more efficiently.

The meat block with bones hung by the hanger can be guided along the guide or guide means extending parallel along the support rail for supporting the hanger, and the operation of dissecting/boning/dressing the meat block with bones can be done while the hanger is transferred or moved along the support rail, so that the operation can be performed while adjusting the inclination or horizontality of the meat block with bones flexibly as needed.

Further, as the operation is carried out while the meat block with bones is transferred along the guide or guide means with the lower part of the meat block with bones being brought into contact with the surface of the guide member made of pipe or bar material, the meat block with bones contacts in line contact with the guide or guide means, so that the contamination of the meat block with bones with bacteria, etc., is suppressed, and the operation of dissection/boning/dressing can be performed highly sanitarily.

DETAILED DESCRIPTION

A preferred embodiment of the present invention will now be detailed with reference to the accompanying drawings. It is intended, however, that unless particularly specified, dimensions, materials, relative positions and so forth of the constituent parts in the embodiments are illustrative only, and not as limiting the scope of the present invention.

Figure 1:
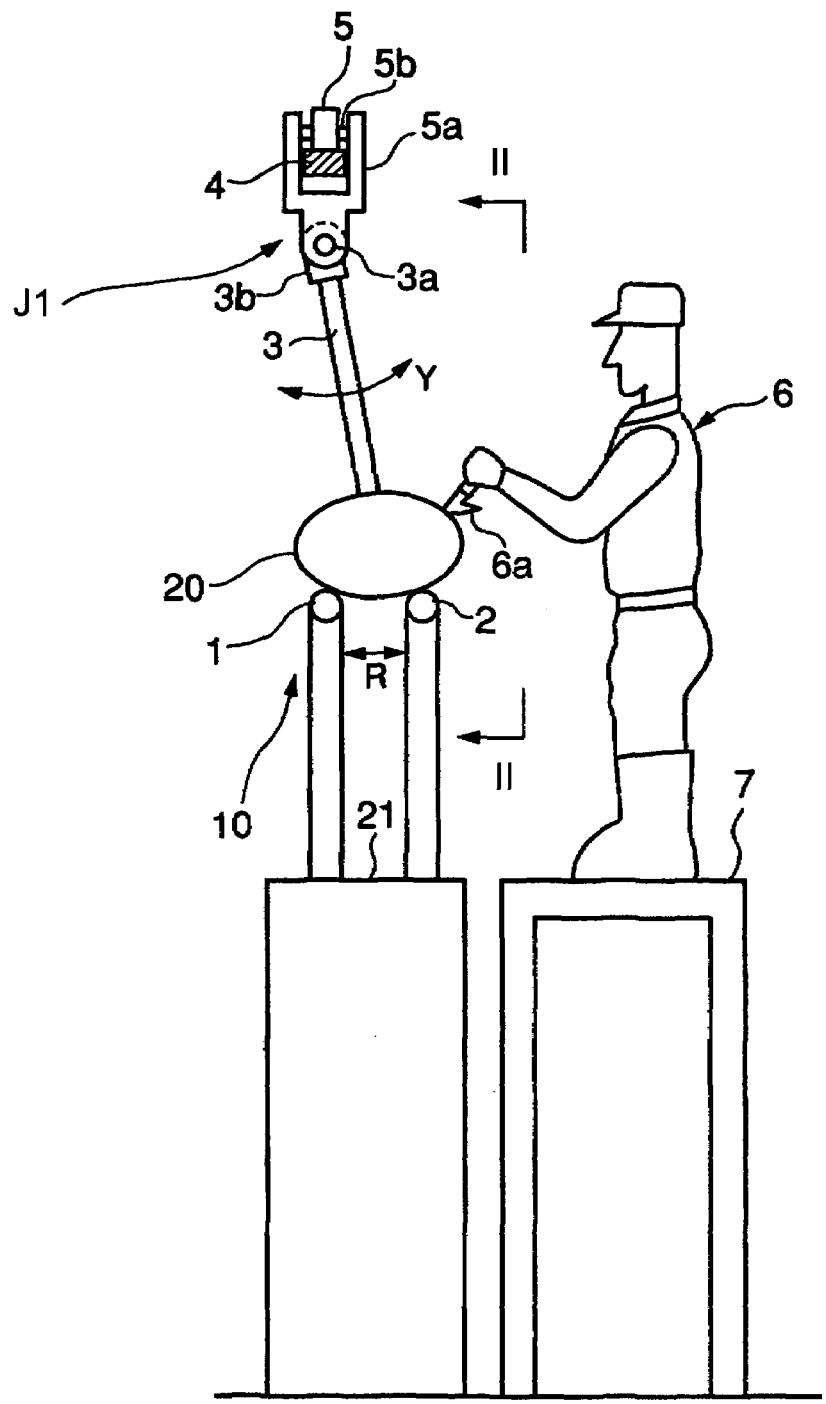
FIG. 1 illustrates a side view of the first embodiment of the meat dressing/boning system according to the present invention.
Figure 2:
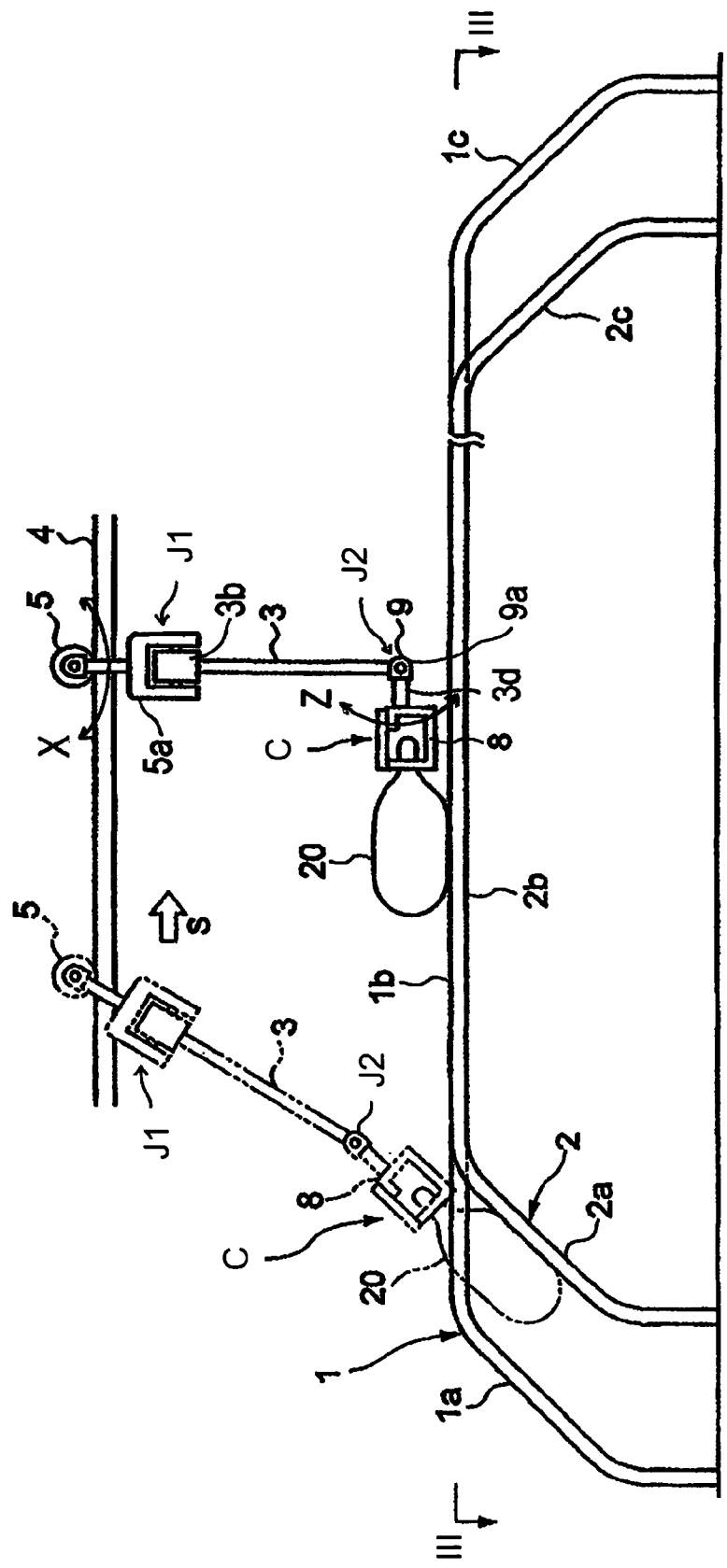
FIG. 2 illustrates a view taken along arrows II-II of FIG. 1.
Figure 3:
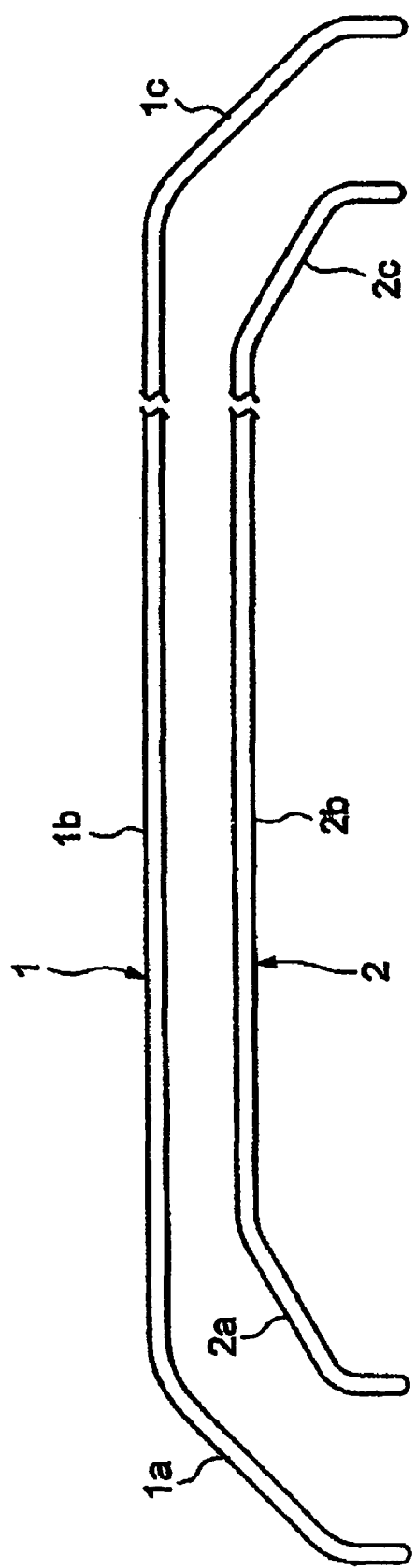
FIG. 3 illustrates a view taken along arrows III-III of FIG. 2.

Referring to FIGS. 1-3, a meat block 20 of pig, chicken, etc., with bones (hereafter referred to as a meat block) to be dissected, boned, or dressed is supported below a support rail 4, which can be attached to a ceiling of a workshop to transfer/convey the meat block 20. The support rail 4 is positioned above the worker 6 and extends along a straight line or curved line, along the direction of the processing of dissection and boning of the meat block 20 (along the direction extending toward left and right of the worker 6).

A meat-block support or hanger is suspended from the support rail 4 and movable therealong so that it can support and carry the meat block 20 along the processing line. The meat-block support includes a supporting member or bar 3, a support-rail connector 5, 5a pivotally connected to the supporting bar 3 to provide a first pivot, and a clamp-mechanism connector 3d pivotally connected to the supporting bar to provide a second pivot. A clamp mechanism C is connected to the clamp-mechanism connector 3d. The support-rail connector 5, 5a is movably connected to the support rail 4 and is pivotally connected relative to the support rail to provide a third pivot. The support-rail connector can include a roller 5 and a roller support 5a. The roller 5 is rotatably connected to the roller support 5a with a pin 5b, namely at the upper part of the roller support 5a with the roller 5 rollable on the rail 4 to form. The meat block held by the clamp mechanism is rotatable about first, second, and third axes.

The first pivot includes a first joint J1, which comprises a joint bracket 3b fixed to the upper end of the supporting bar 3 and a pin 3a for rotatably supporting the joint bracket 3b relative to the roller support 5a. The joint bracket 3b is rotatably connected to the lower part of the roller support 5a via the pin 3a so that the supporting bar 3 is pivotable about the first axis, along the Y-direction in FIG. 1, and allows the lower end of the supporting bar 3 to be drawn toward or away from the worker 6. Hereafter, the Y-direction is referred to as accessing/departing direction.

The roller support 5a can be swung around the pin 5b about the third axis, along a plane containing the extending line of the rail 4, along arrows X in FIG. 2, and the supporting bar 3 can be swung around the pin 3a about the first axis, along a plane containing a straight line perpendicular to the rail 4 and the center axis of the supporting bar 3 in the accessing/departing directions to and from the worker 6 as shown by arrows Y in FIG. 1.

The clamp mechanism C is pivotally attached to the supporting bar via the clamp-mechanism connector, which can be a connecting bar 3d. The second pivot includes a second joint J2, which comprises a second joint bracket 9 formed at one end of the connecting bar 3d and a pin 9a that is attachable to the second joint bracket 9 and the lower end of the supporting bar 3. The pin 9a extends perpendicular to the pin 3a to allow the connecting bar 3d to pivot about the second axis, along arrows Z. That is, the second joint bracket 9 is supported for rotation by the pin 9a about the second axis. The clamp mechanism C is attached to the opposite end of the connecting bar 3d. The clamp mechanism C is thus pivotable along a plane containing the supporting bar 3 and parallel to the rail 4 as shown by arrows Z in FIG. 2. The meat block 20 is held at its root of bone part, which is a part near a joint of bone, with the clamp mechanism C as shown in FIG. 2.

Figure 5B:
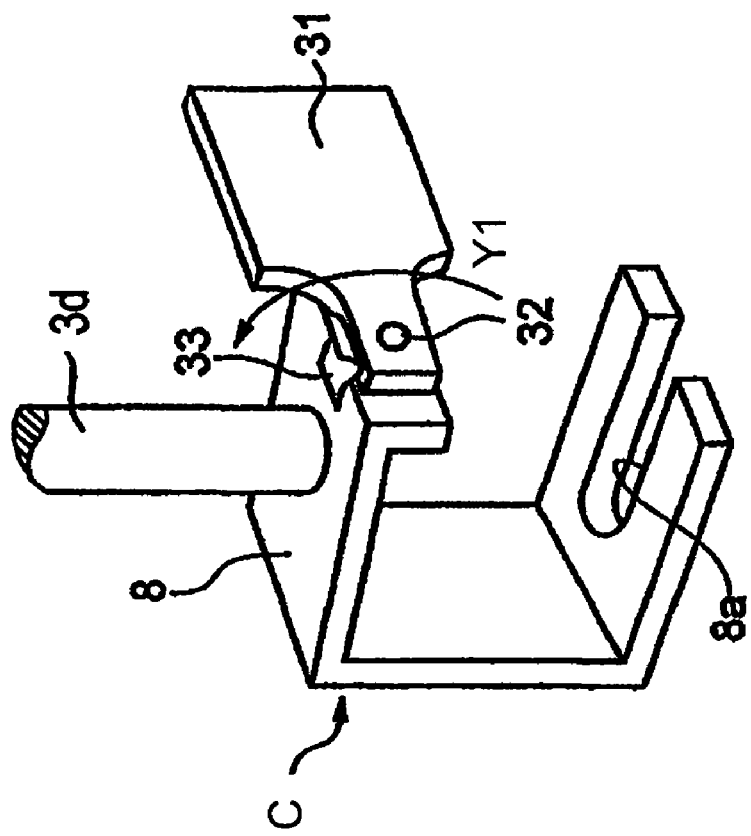
FIGS. 5A and 5B are perspective views of the first clamp mechanism.
Figure 5A:
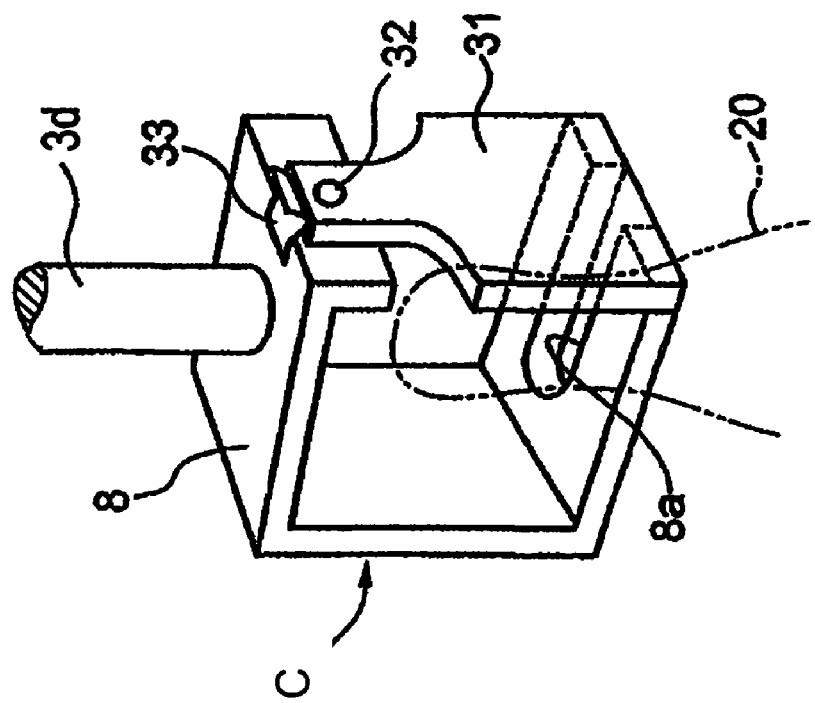

Referring to FIGS. 5A and 5B, the clamp mechanism C includes a damper 8 that can be fixed to the connecting bar 3d. Alternatively, the damper 8 can be rotatably connected to the connecting bar 3d so that the clamp mechanism C is rotatable around the connecting bar 3d about a fourth pivot. See FIG. 6A and 6B. The damper 8 has an upper plate, a lower plate, and a side plate connecting the upper and lower plate to form a C-shaped or similar cross section. The upper plate has a protruding part that extends parallel to the side plate. The lower plate has a groove, cutout, or slot 8a having a general U shape, or otherwise configured to receive and hold the root of a bone part near a joint of bone of the meat block. The upper plate can be fixedly or rotatably connected to the lower end of the connecting bar 3d.

The clamp mechanism C also includes a stopper 31 that closes the opening of the groove, cutout, slot, etc., 8a from the opposite side of the side plate. The stopper 31 can be pivotally attached with a pin 32 to the protruding part extending parallel to the side plate of the damper 8. A plate spring 33 can be attached to the upper plate to keep the stopper 31 in a closed position, namely to prevent the meat block 20 from sliding out of the slot 8a by pushing the upper surface of the stopper 31 with a spring force when the stopper 31 closes the opening of the slot 8a in the opposite side of the side plate as shown in FIG. 5A. When the stopper 31 is pivoted around the pin 32 in a direction Y1 in FIG. 5B to open the opening in the opposite side of the side plate, the stopper 31 is also configured to keep it in an opened state with a side face thereof pushed by the spring force of the plate spring 33.

In FIG. 1, a pair of meat block guides 10 for guiding the meat block 20 is positioned below the rail 4. The meat block guides includes an inner guide 2 located nearer to the worker 6 and an outer guide 1 located farther from the worker than the inner guide 2. Both guides are supported on a platform 21 so that both guides are parallel to the rail 4. As shown in FIG. 1, the distance R between the outer guide 1 and inner guide 2 is maintained so that the meat block 20 can lie stably on the guides without falling down through the space.

The outer guide 1 and inner guide 2 can be made of steel pipe or bar or rail coated with heat-shrinkable resin on the outer surface, but a pipe or bar made of material safe for food such as, for example, stainless steel or resin can be suitably used for the guides. Referring to FIG. 2, the outer guide 1 and inner guide 2 are formed to have initial rising or upwardly inclined sections 1a and 2a, respectively, for introducing the meat block 20, i.e., the initial processing sides of the guides are inclined for guiding the meat block 20 along the inclined direction. Horizontal sections 1b and 2b are formed continuing from the upwardly inclined sections 1a and 2a, respectively, and then downwardly inclined sections 1c and 2c are formed continuing from the horizontal sections 1b and 2b, respectively, for guiding the meat block 20 downwardly.

Referring to FIG. 1, a platform 7 for supporting the worker 6 can be provided. The platform 7 can be moved up and down (although the mechanism for it is not shown in FIG. 1) so that the height position of the meat block 20 relative to the worker 6 can be adjusted so that the worker can more efficiently use a knife 6a.

When performing dissection/boning/dressing of the meat block 20 such as a thigh, for example, the thigh is held at its end part of the thigh bone in the slot 8a of the clamper 8 and moved up to lie on the inclined parts 1a and 2a of the pair of meat block guides 10, while the thigh (meat block 20) is hanging from the rail 4 by way of the roller 5, roller support 5a, first joint J1, supporting bar 3, second joint J2, connecting bar 3d, and the clamping mechanism C. In this attitude, the initial processing is carried out.

That is, when performing the initial processing of dissection and boning of the meat block 20, the meat block 20 is brought to be in an attitude leaning on the upwardly inclined sections 1a and 2a of the pair of meat block guides 10 by virtue of the meat-block support pivoting along arrows X around the pin 5b (about the third axis), and pivoting along arrows Y around the pin 3a (about the first axis) of the first joint J1, the swing direction X and Y being perpendicular to each other. The initial processing is carried out while the meat block 20 is lifted upwards along the inclining sections of the pair of meat block guides 10 with the outer surface of the stopper 31 of the clamp mechanism C facing the upper left as shown in phantom lines in FIG. 2.

After the initial processing is carried out as described above, the meat block 20 is transferred to the horizontal sections of the outer guide 1b and 2b extending parallel to the rail 4 by the transfer of the roller 5. Then, the main processing, such as dressing meat, removing fat, is carried out by the worker 6 with the knife 6a while the meat block 20 is allowed to lie on the horizontal sections 1b and 2b and transferred in this attitude along the horizontal sections 1b and 2b in the direction S as shown by solid lines in FIG. 2.

The main processing is done while the meat block 20 is hung from the rail 4 by way of the roller 5, roller support 5a, first joint J1, supporting bar 3, second joint J2, connecting bar 3d, and clamp mechanism C, and lying on the pair of guides. The meat block 20 is held while it is capable of being swung in the accessing/departing direction to or from the worker 6 as shown by arrows Y in FIG. 1 by virtue of the first joint J1, and also to be capable of being swung in a plane containing the supporting bar 3 and parallel to the rail 4 as shown by arrows Z in FIG. 2 by virtue of the second joint J2. Accordingly, the degrees of freedom of the worker 6 when carrying out dissection/boning/dressing is increased, as the meat block is processed while it is capable of being swung in two directions perpendicular to each other, that is, in the direction along the rail 4 (directions X in FIG. 2) and in the accessing/departing direction to or from the worker (directions X in FIG. 1).

Figure 6B:
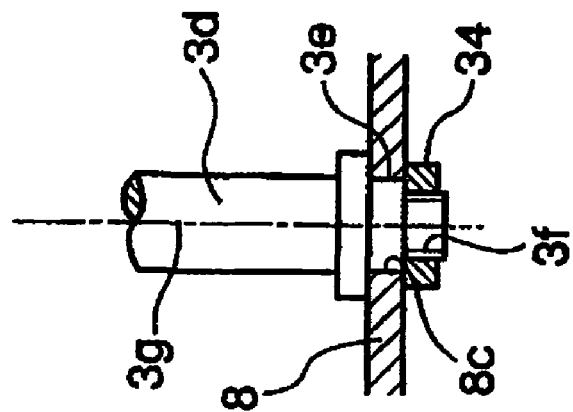
FIG. 6B is a sectional view taken along lines VIB-VIB of FIG. 6A.
Figure 6A:
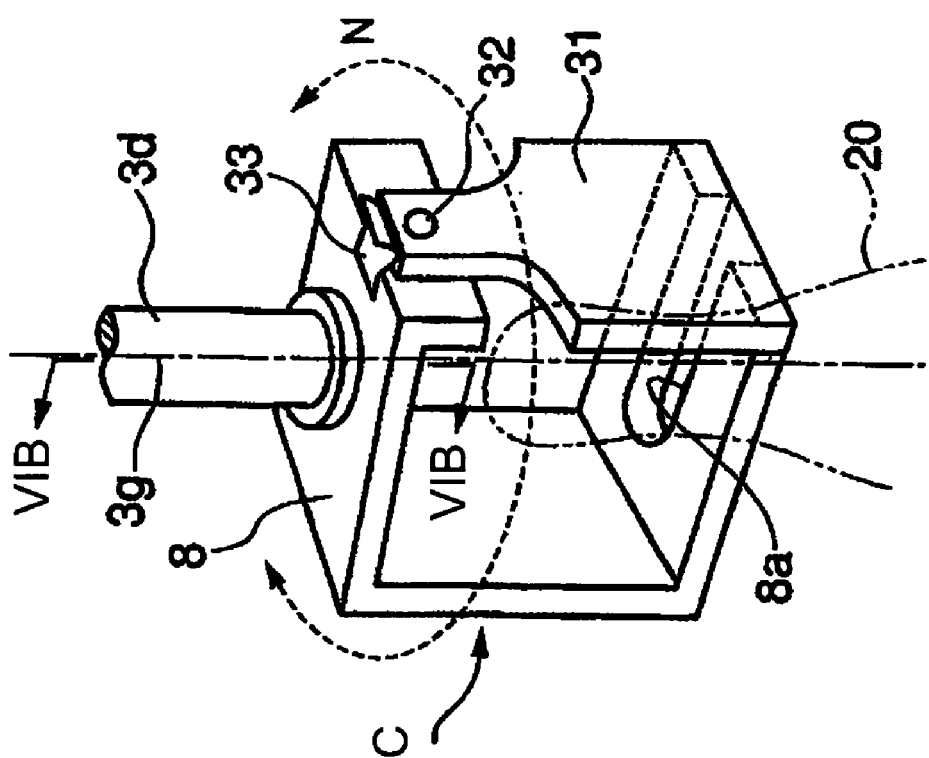
FIG. 6A is a perspective view of another embodiment of the first clamp mechanism.

Further, as the meat block 20 is capable of being swung in the accessing/departing direction to or from the worker 6 (directions Y in FIG. 1) by virtue of the first joint J1, and capable of being swung in the vertical direction (directions Z in FIG. 2) by virtue of the second joint J2, the worker 6 can perform dissection/boning/dressing while moving the meat block 20 partway in the accessing/departing direction and in the vertical or near vertical direction. The meat block 20 can be rotated partway around the connecting bar in the case the clamp mechanism C is connected rotatably to the connecting bar, as illustrated in FIGS. 6A and 6B. Therefore, the worker 6 can adjust the attitude of the meat block 20 in a certain degree to ease his/her operation maximally, which contributes to increase in work efficiency.

The meat block 20 undergone the main processing as described above is transferred to the downward inclined sections 1c and 2c in the discharging side continuing from the horizontal sections 1b and 2b, and the lower end part of the meat block 20 can be processed lastly while it is hung and leaning on the downwardly inclined sections 1c and 2c.

As the meat block 20 is held by its root of bone part to the slot 8a of the clamper 8 and hung from the rail 4 by way of the roller 5 transferring on the rail 4, roller support 5a, first joint J1, supporting bar 3, second joint J2, and connecting bar 3d, the meat block 20 capable of swinging in three directions (about the first, second, and third axes) perpendicular to each other, i.e., the direction along the rail 4 (directions X in FIG. 2), the direction of accessing/departing to or from the worker (directions Y in FIG. 1), and the vertical or nearly vertical direction (directions Z in FIG. 2). The meat block 20 held as described above is transferred with a part of its outer surface contacting to the pair of meat block guides 10, each extending substantially parallel to the rail 4, and the operation of dissection/boning /dressing is done while transferring the meat block 20. Therefore, the attitude of the meat block 20 is determined according to the form of the meat block guides 10 which is changed along the extending direction of the rail 4, and the dissection/boning/dressing can be done with the attitude of the meat block 20 being determined in accordance with the degree of slanting and horizontalness of the meat block guides 10.

As the meat block 20 is supported stably on the outer guide 1 and inner guide 2 with a lower part of the surface thereof contacting to the guides so that it can be slid on the guides in the direction along the rail 4 in a state where it is held by its root of bone part by the damper 8 so as to be capable of being swung in three directions, the worker 6 need not secure the meat block 20 with his/her hand, and the worker can easily carry out dissection/boning/dressing with both hands. Therefore, dissecting/boning/dressing operation can be simplified and operation time can be reduced.

Further, as dissecting/boning/dressing operation is performed while the meat block 20 is transferred along the meat block guides 10 with its lower face contacting to the surface of the outer guide 1 and inner guide 2 made of pipe or bar, the meat block 20 is processed while it is supported on the outer guide 1 and inner guide 2 with a line contact, as opposed to a plane contact. Therefore, contamination of the meat block 20 with bacteria and so forth is suppressed compared to the system in which the meat to be treated is supported with a plane contact.

Further, the meat block can be processed flexibly in an inclined attitude leaning against the meat block guides 10 or in a horizontal attitude lying on the meat block guides 10 only by holding the meat block 20 with the clamp mechanism C and guiding it along the pair of meat block guides 10 without particular operation from the worker.

Further, according to the embodiment, as the meat block 20 is processed while transferred continuously along the rail 4 with a part of the bone thereof clamped by the clamping mechanism C, the meat blocks 20 can be transferred without changing the transferring order thereof even if a plurality of workers are engaged in processing, and traceability of the processed meat block can be assured. The clamp mechanism C and second joint bracket 9 can be detached after removing the pin 9a for cleaning after the processing of the meat block 20 is finished.

Figure 4:
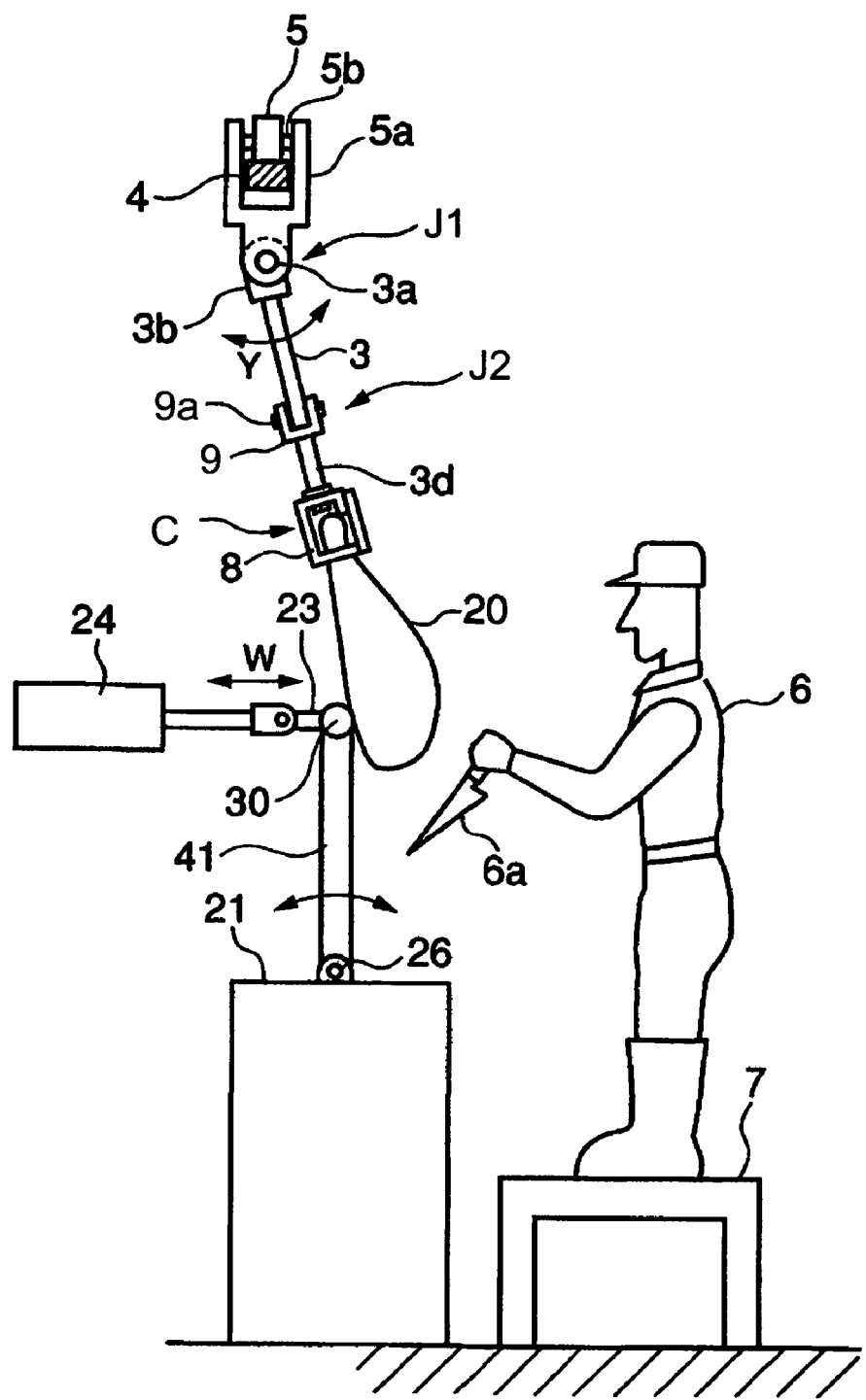
FIG. 4 illustrates a side view of the second embodiment of the meat dressing/boning system according to the present invention.

Referring to FIGS. 4 and 6, which illustrate the second embodiment, which is substantially similar to the first embodiment. In the second embodiment, a meat block guide 30 made of rail, pipe or bar material, extends parallel to the rail 4 and movable in directions of accessing/departing to or from the worker 6 (directions W in FIG. 4). The meat block 20 comes into line contact with the surface of the meat block guide 30.

In FIG. 4, the meat block guide 30 can be supported by links 41, which are pivotally supported by a shaft 26. The guide extends parallel to the rail 4 and mounted to a platform 21 so that it can be moved in directions of accessing/departing to or from the worker 6. To the meat block guide 30 is connected a horizontal link 23 that is connected to an air cylinder or hydraulic cylinder 24 for pivoting the links 41.

In FIG. 4, the rail 4 attached to the ceiling of a workshop to transfer the meat block 20 extends above the worker 6, extending along a straight line or curved line, along the direction of processing the dissection/boning/dressing of the meat block 20 (along directions extending to left and right of the worker 6).

The composition of the hanging mechanism of the meat block 20 shown in FIG. 4 is similar to that of the first embodiment of FIG. 1.

FIGS. 6A and 6B show another embodiment of the clamp mechanism C in detail. The clamp mechanism C of FIG. 6A is similar to that of FIG. 5A except that the connecting bar 3d of FIG. 5A is connected rotatably to the damper 8. Referring to FIG. 6B, an inserting portion 3e of the connecting bar 3d is loosely fitted to a hole 8c in the damper 8 so that the damper 8 can be rotated around the center axis 3g of the connecting bar 3d as shown by arrows N. A stopper nut 34 is screwed to the threaded end part of the connecting bar 3d to prevent the connecting bar 3d from moving along the axial direction thereof.

According to the second embodiment, the meat block 20 held by the clamp mechanism C is hung from the rail 4 by way of the roller 5, roller support 5a, first joint J1, supporting bar 3, second joint J2, and connecting bar 3d, can be swung in directions of accessing/departing to or from the worker 6 (the direction of arrows Y in FIG. 4), so that the distance from the worker to the meat block 20 can be changed by swinging the meat block guide 30 in the direction of accessing/departing to or from the worker 6 as indicated by arrows W by actuating the hydraulic cylinder 24.

Therefore, according to the second embodiment, as the meat block guide 30 is supported pivotably around the shaft 26 by means of the links 41, the meat block 20 can be swung by virtue of the first articulate member J1 by actuating the hydraulic cylinder 24 to push or pull the meat block guide 30 in directions W in FIG. 4 so as to swing the meat block guide 30. Accordingly, the dissection and boning operation can be carried out while changing freely the degree of inclination of the meat block 20 and distance to it from the worker 6.

Further, as the meat block is held by its root of bone part in the groove 8a of the clamp 8 and the inserting part 3e of the connecting bar 3d is loosely fitted to the hole 8c of the damper 8, knife operation in the vertical direction including removing fat and dressing meat can be done easily while rotating the meat block 20 around the axis 3g of the connecting bar 3d as shown by N in FIGS. 6A and 6B.

The present invention can provide a meat dressing/boning method and system therefore that can prevent bacterial contamination, while achieving easy dissection, boning, and dressing operation of a meat block with bones to decrease the operation time.

While the present invention has been particularly shown and described with reference to particular embodiments, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

What is claimed is:

1. A method of dressing/boning a meat block having a bone with a root part that forms a bone joint, the method comprising the steps of:
    providing a support rail extending along a processing line;
    securing the root part of the bone in the meat block to a clamp mechanism;
    suspending the clamp mechanism to the support rail with a meat-block support having at least first and second pivots to allow the meat block held by the clamp mechanism to rotate about at least first and second axes;
    supporting the meat block held by the clamp mechanism with a guide made of a pipe or bar, wherein the guide extends along and below the support rail, and is configured so that the meat block comes into a line contact with the guide; and
    dissecting/boning/dressing the meat block while the meat block is in contact with the guide,
    wherein the clamp mechanism includes a plate with a slot adapted to received the root part of the bone in the meat block, and
    wherein the clamp mechanism is rotatable relative to the meat-block support to allow the meat block held by the clamp mechanism to rotate about a third axis.

2. The method according to claim 1, wherein the guide includes a movably mounted guide rail extending along the support rail, the guide rail being movable toward and away from a worker.

3. The method according to claim 2, wherein the meat block is dissected/boned/dressed while restricting the displacement of the guide rail.

4. A method of dressing/boning a meat block with bones, the method comprising the steps of:
    providing a support rail extending along a processing line;
    securing the meat block with bones to a clamp mechanism;
    suspending the clamp mechanism to the support rail with a meat-block support having at least first and second pivots to allow the meat block held by the clamp mechanism to rotate about at least first and second axes;
    supporting the meat block with bones held by the clamp mechanism with a guide made of a pipe or bar, wherein the guide extends along and below the support rail, and is configured so that the meat block with bones comes into a line contact with the guide; and
    dissecting/boning/dressing the meat block with bones while the meat block with bones is in contact with the guide,
    wherein the meat-block support includes a supporting bar, a support-rail connector pivotally connected to the supporting bar to provide the first pivot, and a clamp-mechanism connector pivotally connected to the supporting bar to provide the second pivot, wherein the clamp-mechanism connector is connected to the clamp mechanism, and wherein the support-rail connector is movably connected to the support rail and is pivotally connected relative to the support rail to provide a third pivot.

5. The method according to claim 4, wherein the clamp mechanism is rotatably connected to the clamp-mechanism connector to provide a fourth pivot, and wherein the meat block with bones is boned/dressed while rotating clamp mechanism with the meat block with bones as necessary.

6. The method according to claim 4, wherein the support-rail connector is pivotable relative to the support rail about a third axis, wherein the supporting bar is pivotable relative to the support-rail connector about the first axis, wherein the clamp-mechanism connector is pivotable relative to the supporting bar about the second axis, and wherein the first axis is perpendicular to the second and third axes.

7. The method according to claim 6, wherein the first axis is parallel to the processing line direction, wherein the first pivot comprises a first pivot joint provided between the support-rail connector and the supporting bar, the supporting bar being pivotable about the first axis, wherein the second pivot comprises a second pivot joint provided between the supporting bar and the clamp-mechanism connector, the clamp-mechanism connector being pivotable about the second axis, which is perpendicular to the first axis, and wherein the movement of the meat block with bones about the first and second axes is restricted by the contact of the meat block with bones with the guide.

8. A method of dressing/boning a meat block with bones, the method comprising the steps of:
    providing a support rail extending along a processing line;
    securing the meat block with bones to a clamp mechanism;
    suspending the clamp mechanism to the support rail with a meat-block support having at least first and second pivots to allow the meat block held by the clamp mechanism to rotate about at least first and second axes;
    supporting the meat block with bones held by the clamp mechanism with a guide made of a pipe or bar, wherein the guide extends along and below the support rail, and is configured so that the meat block with bones comes into a line contact with the guide; and
    dissecting/boning/dressing the meat block with bones while the meat block with bones is in contact with the guide,
    wherein the guide includes a pair of guide rails extending along the support rail, each of the guide rails having an inclined section for raising the meat block with bones and a horizontally extending section continuing from the inclined section and extending substantially parallel to the support rail.

9. The method according to claim 8, wherein the guide rails are spaced apart so that the guide rails support the meat block with bones, and wherein the meat block with bones is boned/dressed while the meat block with bones is resting on the guide rails.

10. The method according to claim 9, wherein the meat block with bones is boned/dressed in the horizontally extending portions of the guide members with the attitude thereof in the vertical direction kept stable.

* * * * *